United States Patent [19]
Steiner

[11] 3,774,992
[45] Nov. 27, 1973

[54] OPTICAL FRAMING DEVICE FOR PHOTOGRAPHIC CAMERAS

[76] Inventor: Irving Steiner, 30 Edwards Rd., Mastic Beach, L. I., N.Y. 11951

[22] Filed: Mar. 6, 1972

[21] Appl. No.: 232,056

[52] U.S. Cl. .................. 350/236, 350/58, 350/60, 350/195, 350/204, 95/65
[51] Int. Cl. .......................................... G02b 27/02
[58] Field of Search.................... 350/60, 193, 194, 350/195, 204, 319, 58, 236; 95/65

[56] References Cited
UNITED STATES PATENTS

| | | | |
|---|---|---|---|
| 3,527,151 | 9/1970 | Harrison | 95/65 |
| 2,845,835 | 8/1958 | Weiss | 350/60 |
| 3,582,188 | 6/1971 | Rau | 350/186 |
| 1,127,763 | 2/1915 | Howland | 95/65 |
| 3,639,040 | 2/1972 | Tglka | 350/193 |
| 3,064,523 | 11/1962 | Meltzer | 350/204 |

Primary Examiner—David Schonberg
Assistant Examiner—Michael J. Tokar
Attorney—Burton L. Lilling et al.

[57] ABSTRACT

A tubular telescoping member of concentric, translucent plastic rings is provided at one end with a mount adapted to grip the accessory ring of a camera lens assembly and with a centrally pierced diffusing lens at the other. Light passing through the central orifice of the diffusing lens is unaffected by the optical framing device and produces a clear, true image on the film. Light entering the objective lens after passing through the diffusing lens, in combination with the light entering through the translucent periphery of the tubular member, produces concentric rings of differing brightness and color on the film, surrounding the aforementioned image in the center of the negative.

5 Claims, 5 Drawing Figures

OPTICAL FRAMING DEVICE FOR PHOTOGRAPHIC CAMERAS

BACKGROUND OF THE INVENTION

The invention relates to devices for the modification of the recorded image in cameras. More particularly, it relates to such devices for the creation of diffused bands, borders or haloes around the subject in a camera for portraiture.

It is a generally known method in the photographic arts to interpose a diffusing membrane, with a suitable cutout, between the projector and the light-sensitive paper at the time of printing a portrait negative; this procedure resulting in the obliteration of detail near the perimeter of the final picture.

Such a procedure is not available to the non-professional photographer who does not do his own developing and printing and who, if he wishes to create the aforementioned halo effect, must have means to accomplish his ends at the time of taking the picture.

Apart from the general desire to produce artistic portraits, the amateur photographer is further impelled towards the framing of his portraiture by a diffuse band by the nature of his equipment; it is not generally suited to portrait photography. The optics of the commonly manufactured cameras are compromises between the requirements of portrait and landscape photography and when used in the former mode provide pictures in which only a small portion of the exposed negative carrier the subject image. Very few amateur photographers have interchangeable wide-angle lenses, or special portrait cameras.

It is therefore a primary objective of the invention to provide an attachment readily adapted to cameras in common use for the generation of artistic borders around the perimeters of photographic negatives.

It is a further objective of the invention to provide, in the attachment described above, for ease of storage, attachment and use.

SUMMARY

The invention provides an accessory device for fitting over the lens-mount of a camera. The device comprises a telescopically extensible, segmented barrel, a shading ring around the end of the barrel, and a diffusing lens with a centrally located circular orifice.

The telescopic segments of the barrel normally include at least one member with a definite translucency to some portion of the visible spectrum.

In use, the device is attached to the camera and the usual adjustments for focus and exposure made. Upon taking a picture, that portion of the incident light which passes through the central orifice of the diffusing lens is totally unaffected by the presence of the device; this portion is aligned with the subject and forms the portrait portion of the final negative. Light entering the barrel near its periphery first passes through the diffusing lens where the informational content of the rays is scrambled, resulting in a halo whose brightness averages the intensity of the incident beam. Additional light enters the barrel through the translucent portion, or portions, of its circumference and is added, or modifies, the diffused pattern.

The secondary illumination of the halo is particularly effective in creating artistic effects when the exposure is taken on color-sensitive film. By suitable choice of the light-transmitting characteristics of the several members of the telescoping barrel concentric rings of differing color or hue may be produced, substantially enhancing the visual impact of the central image in the resulting picture.

The base of the telexcoping barrel is shaped to fit over the lens accessory ring, or — in cameras appropriately equipped to snap over the bayonet mount.

DESCRIPTION OF THE ACCOMPANYING DRAWINGS:

The invention is described with reference to the accompanying drawings, in which.

Figure 1:
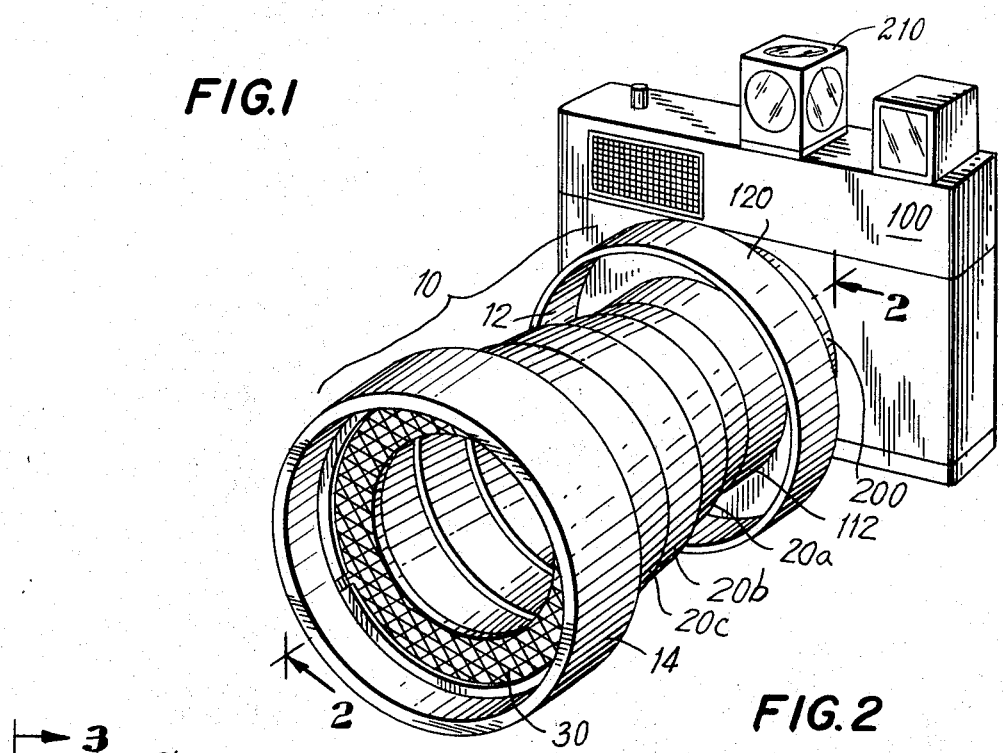
FIG. 1 is a perspective view of a hand-held camera on which the optical framing device of the invention is mounted.

DESCRIPTION OF THE PREFERRED EMBODIMENT:

The perspective view of FIG. 1 shows a camera body 100 and a lens assembly 200, together with an optical framing device 10 frictionally engaged over the lens assembly. The framing device 10 is provided with a base 12, a number of telescoping tubular elements forming a barrel — including typical element 20b — and a diffuser mount 14 supporting a diffuser lens 30.

Figure 2:
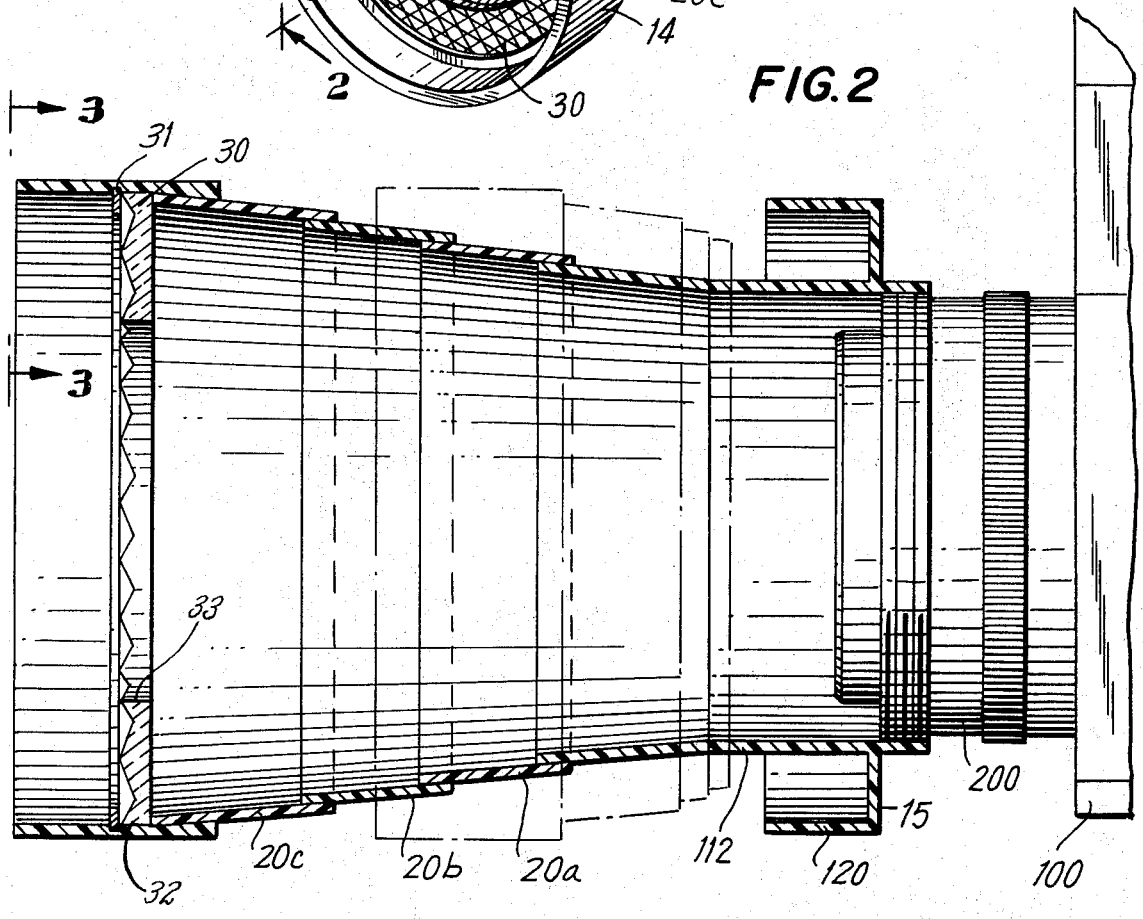
FIG. 2 shows the framing device in section, along line 2—2 of FIG. 1, in both the open and closed positions.

In FIG. 2, as well as FIG. 1, the optical framing device 10 is shown in the fully extended position; the collapsed outline being indicated by broken lines in the former. FIG. 2 is a transverse section through the device 10 and shown the manner in which a pierced base-plate 15 of the base 12 is slipped over, and frictionally engaged by, the lens assembly 200 of the camera.

The base plate 15 interconnects the outer and inner rings, 120 and 112, of the base 12; the two rings being disposed coaxially and forming a recess 13 for the reception of the telescoping rings — 20a, 20b and 20c — of the collapsed barrel.

The three telescopic elements, unlike the base 12 and the diffuser mount 14, are not opaque but have a certain degree of restricted light-transmitting capability; the element 20a is made from a green plastic, while its mating members 20b, and 20c are translucent in the red region of the spectrum. While this arrangement of colored, translucent elements is arbitrary, the particular combination described above provides a very attractive rainbow-like frame around the photograph.

It should be noted that the several telescoping elements are arranged on a conical surface substantially coinciding with the light-gathering angle of the lens 200, and that the device may be used in conjunction with flash means, such as the flash cube 210 which in fact provides for more sharply defined diffused bands.

Figure 3:
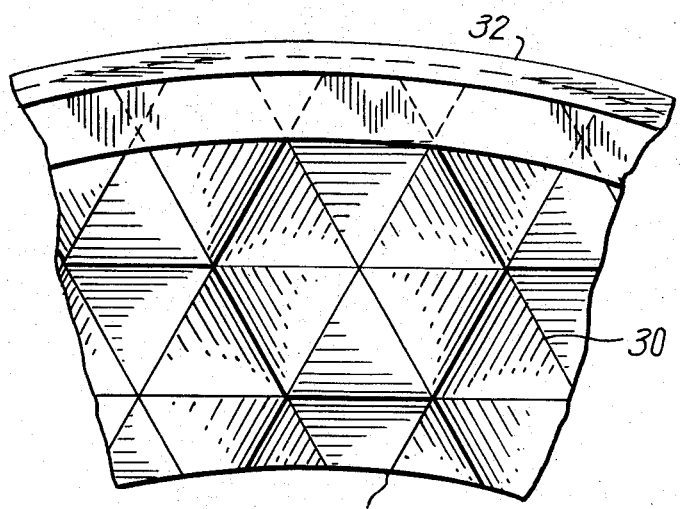
FIG. 3 is a partial view of the diffusing ring of the embodiment of FIG. 1, taken along line 3—3 of FIG. 2.
Figure 4:
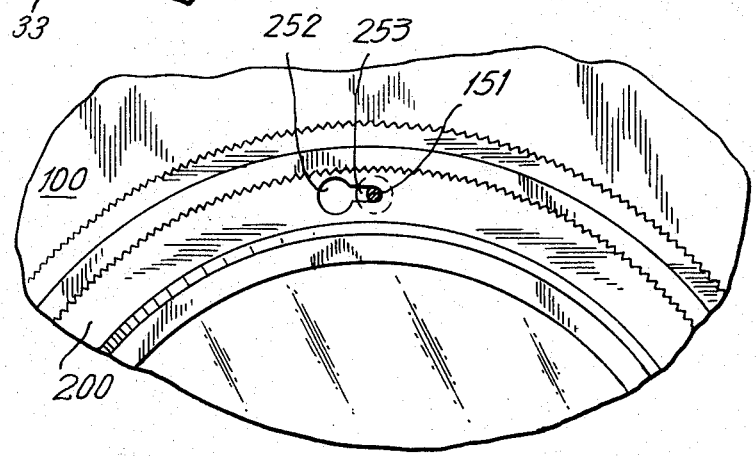
FIG. 4 is a partial, frontal view of the base of a framing device equipped with a bayonet mount.

The diffusing lens 30 is made from a plastic material with a heavily structured surface, particularly adapted to diffusing the incident light. One possible material for such a lens is shown in detail in FIG. 3; the surface showing a hexagonal pattern created from planar elements forming equilateral triangles in the horizontal projection of the drawing. Each of the triangular elements is tilted slightly between its base and apex, each group of six elements having the common intercept of its apices lying in a plane either raised above, or depressed below, the mean elevation of the surface.

The diffusing lens 30 is in the form of a circular ring; the outer radius 32 being retained in the diffuser mount by a snap-ring 31 and the inner radius 33 forming an aperture through which light reflected from the subject may enter the lens 200 undistrubed by the presence of the framing device.

Some cameras are provided with receptacles suitable to engage a projecting member of accessory devices — commonly known as a bayonet mount — and the optical framing device may be provided with such a projecting head, mounted from the base-plate 15 by means of a stalk 151, the head of the projection passing through an aperture 252 in the lens assembly 200. A slot 253 communicating with the aperture 252 engages the stalk 151 upon slight relative rotation of the device 10 and the camera body 100, thereby attaching the optical framing accessory firmly to the camera.

Figure 5:
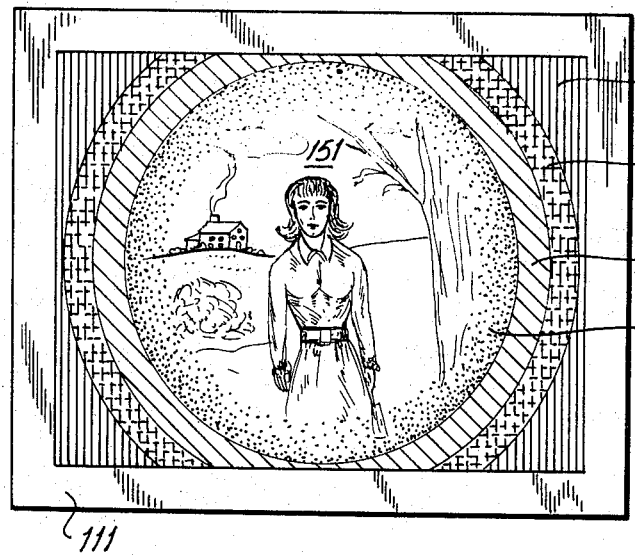
FIG. 5 is a representation of a photograph taken with the aid of the optical framing device.

A photograph 111, resulting from the use of the optical framing device of the instant invention, is shown in FIG. 5. The subject 101 of the photograph occupies the central portion of the finished print and is unaffected in any detail by the use of the device 10; it is surrounded by a number of concentric rings whose outlines and color merge into one-another and into the subject 101. The innermost ring 120c is green in color, the intermediate ring 120b is yellow, while the outermost ring 120a is red. A further region 125, inside the innermost ring 120c, shows a partial diffusion of the subject image and provides an attractive blending of the photographed image 101 into the optically created border surrounding it.

It should be noted that by varying the width of the elements 20, their color and relative overlap, and by the variation of the relative dimensions of the radii 32 and 33 of the diffusing lens 30 the particular effects described with reference to FIG. 5 could be altered. The total width of the optical border created by the device is largely a function of the aperture of the diffusing lens; its relative coherency a function of the diffusive power of that lens; its subdivision into colored bands a function of the number and color of the translucent rings in the telescoping barrel.

For light weight and economic manufacture the several components of the optical framing device will generally be made from plastic materials, but the substitution other forms or materials of construction may be preferable in particular embodiments of the invention.

What is claimed is:

1. An accessory device for photographic cameras, comprising means adapted to engage said device about the lens barrel or housing of the camera lens; a telescopically extensible barrel having a plurality of translucent colored ring elements; and diffusing means having a central, circular orifice adapted to be mounted at the end of said extensible barrel spaced from the camera lens, and aligned parallel to, and coaxial with, said lens, whereby the light diffused in transit through said lens, in combination with the light transmitted through said ring elements form a rainbow-like halo effect of substantially concentric circular bands of light of different coloring or shading blended about the central image formed in said camera and on a developed photograph produced from film used in said camera.

2. The device defined in claim 1, wherein said right elements comprises a plurality of coaxial, tubular elements; at least one of said elements being of a color different then said other elements.

3. The device defined in claim 1, wherein said ring elements comprise a plurality of coaxial, conical elements.

4. The device defined in claim 3, wherein said ring elements form a divergent conical tube; the angle of divergence of said ring elements substantially equalling the angle of view of said lens.

5. The device defined in claim 1, wherein said central orifice of said diffusing ring passes more than half of light incident on said lens.

* * * * *